United States Patent
O'Rourke et al.

(10) Patent No.: US 8,468,299 B2
(45) Date of Patent: Jun. 18, 2013

(54) VIRTUALIZED STORAGE PERFORMANCE CONTROLLER

(75) Inventors: Nicholas M. O'Rourke, Hants (GB); Lee J. Sanders, Hampshire (GB); William J. Scales, Hampshire (GB); Barry D. Whyte, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 12/600,883

(22) PCT Filed: Apr. 29, 2008

(86) PCT No.: PCT/EP2008/055230
§ 371 (c)(1),
(2), (4) Date: Mar. 29, 2010

(87) PCT Pub. No.: WO2008/141900
PCT Pub. Date: Nov. 27, 2008

(65) Prior Publication Data
US 2011/0047329 A1    Feb. 24, 2011

(30) Foreign Application Priority Data
May 22, 2007  (EP) .................................. 01708636

(51) Int. Cl.
*G06F 12/00*   (2006.01)
*G06F 13/00*   (2006.01)
*G06F 13/28*   (2006.01)

(52) U.S. Cl.
USPC ............................ 711/113; 711/203; 718/104

(58) Field of Classification Search
USPC .................................. 711/113, 203; 718/104
See application file for complete search history.

(56) References Cited

U.S. PATENT DOCUMENTS

| | | | |
|---|---|---|---|
| 5,426,736 A * | 6/1995 | Guineau, III | 710/56 |
| 5,732,240 A * | 3/1998 | Caccavale | 711/118 |
| 6,687,765 B2 | 2/2004 | Surugucchi et al. | |
| 7,895,398 B2 * | 2/2011 | Shet et al. | 711/129 |

* cited by examiner

*Primary Examiner* — Stephen Elmore
*Assistant Examiner* — Mark Giardino, Jr.
(74) *Attorney, Agent, or Firm* — Roy W. Truelson

(57) ABSTRACT

An apparatus for real-time performance management of a virtualized storage system operable in a network having managed physical storage and virtual storage presented by an in-band virtualization controller comprises: a monitoring component operable in communication with the network for acquiring performance data from the managed physical storage and the virtual storage; and a cache controller component responsive to the monitoring component for adjusting cache parameters for the virtual storage. The apparatus may further comprise a queue controller component responsive to the monitoring component for adjusting queue parameters for the managed physical storage. The monitoring component, the cache controller component and the queue controller component may be configured to operate periodically during operation of the virtualized storage system.

16 Claims, 3 Drawing Sheets

VIRTUALIZED STORAGE PERFORMANCE CONTROLLER

FIELD OF THE INVENTION

The present invention relates to a technology for controlling performance in storage networks, and more particularly, to an apparatus and method for optimising performance in a heterogeneous storage network having a virtualization controller.

BACKGROUND OF THE INVENTION

Until recently, storage systems have typically operated with small storage area networks (SANs) that provide connectivity between a specific storage device and specific host device drivers that know the capabilities of the storage device. In these environments, performance factors can be tuned by the manufacturer before a product is installed for customer use.

More recently storage virtualisation systems have been developed to enable simplified storage management of different types of storage on one or more large SANs by presenting a single logical view of the storage to host systems. An abstraction layer separates the physical storage devices from the logical representation and maintains a correlation between the logical view and the physical location of the storage.

Storage virtualisation can be implemented as host-based, storage-based or network based. In host-based virtualisation, the abstraction layer resides in the host through storage management software such as a logical volume manager. In storage-based virtualisation, the abstraction layer resides in the storage subsystem. In network-based virtualisation, the abstraction layer resides in the network between the servers and the storage subsystems via a storage virtualisation server that sits in the network. When the storage virtualisation server is in the data path between the hosts and the storage subsystem, this is referred to as in-band virtualisation. The metadata and storage data are on the same path. The server is independent of the hosts with full access to the storage subsystems. It can create and allocate virtual volumes as required and presents virtual volumes to the host. When an I/O request is received, it performs the physical translation and redirects the I/O request accordingly. For example, the SystemStorage® SAN Volume Controller from IBM® (SystemStorage and IBM are registered trademarks of International Business Machines Corporation) is an in-band virtualisation server.

In such storage virtualisation controller (SVC) systems connected between the host computer and the storage devices, the knowledge of the capabilities and performance characteristics of the storage devices has typically not been available to the SVC. In addition, SVCs typically use many different types of storage on large SANs. The virtualisation system may not have been specifically tuned to work with a particular storage device, and, in an environment in which the virtualization appliance allows the attachment of devices from many vendors and the use of many types of storage controller, the performance characteristics of these devices and controllers can vary greatly.

There is no such thing as a typical system environment, and therefore performance tuning today requires much user thought and continued maintenance. There is no simple way to determine that 'device X is causing problems' or 'controller Y could perform better'. In conventional systems of this type, there is no automated method to help users configure, balance and maintain the best performance possible from the system as a whole.

It would thus be desirable to have a technology for controlling performance in storage networks, and more particularly, to have an apparatus and method for optimising performance in a heterogeneous storage network having a virtualization controller.

SUMMARY OF THE INVENTION

The present invention accordingly provides, in a first aspect, an apparatus for real-time performance management of a virtualized storage system operable in a network having managed physical storage and virtual storage presented by an in-band virtualization controller comprising: a monitoring component operable in communication with the network for acquiring performance data from the managed physical storage and the virtual storage; and a cache controller component responsive to the monitoring component for adjusting cache parameters for the virtual storage.

The apparatus preferably further comprises a queue controller component responsive to the monitoring component for adjusting queue parameters for the managed physical storage.

Preferably, the monitoring component, the cache controller component and the queue controller component are configured to operate periodically during operation of the virtualized storage system.

Preferably, the cache controller component is operable, responsive to the monitoring component, to adjust a cache size parameter for the virtual storage.

Preferably, the cache controller component is operable, responsive to the monitoring component, to adjust a destage rate parameter for the virtual storage.

Preferably, the queue controller component is operable, responsive to the monitoring component, to adjust a queue concurrency parameter for the managed physical storage.

Preferably, the monitoring component is further operable to store and report a comparison of the performance data from the managed physical storage and the virtual storage with a benchmark of performance data.

Preferably, the virtualized storage system in a network having managed physical storage and virtual storage presented by an in-band virtualization controller comprises heterogeneous devices attached to the network.

Preferably, the heterogeneous devices attached to the network comprise storage controllers and disk storage devices.

In a second aspect, there is provided a method for real-time performance management of a virtualized storage system operable in a network having managed physical storage and virtual storage presented by an in-band virtualization controller comprising the steps of: acquiring, by a monitoring component operable in communication with the network, performance data from the managed physical storage and the virtual storage; and responsive to the monitoring component, adjusting by a cache controller component cache parameters for the virtual storage.

The method preferably further comprises the step, responsive to the monitoring component, of adjusting by a queue controller component queue parameters for the managed physical storage.

Preferably, the monitoring component, the cache controller component and the queue controller component are configured to operate periodically during operation of the virtualized storage system."

Preferably, the cache controller component is operable, responsive to the monitoring component, to adjust a cache size parameter for the virtual storage.

Preferably, the cache controller component is operable, responsive to the monitoring component, to adjust a destage rate parameter for the virtual storage.

Preferably, the queue controller component is operable, responsive to the monitoring component, to adjust a queue concurrency parameter for the managed physical storage.

Preferably, the monitoring component is further operable to store and report a comparison of the performance data from the managed physical storage and the virtual storage with a benchmark of performance data.

Preferably, the virtualized storage system in a network having managed physical storage and virtual storage presented by an in-band virtualization controller comprises heterogeneous devices attached to the network.

Preferably, the heterogeneous devices attached to the network comprise storage controllers and disk storage devices.

In a third aspect, there is provided a data carrier having functional data thereon, the functional data comprising functional computer data structures to, when loaded into a computer system and operated upon thereby, enable the computer system to perform all the steps of a method according to the second aspect.

In a fourth aspect, there is provided a computer program comprising computer program code to, when loaded into a computer system and executed thereon, cause the computer system to perform all the steps of a method according to the second aspect.

Preferred embodiments of the invention thus contemplate, in their broadest aspect, a technology for controlling performance in storage networks, and more particularly, an apparatus and method for optimising performance in a heterogeneous storage network having a virtualization controller.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

The preferred embodiment of the present invention is operable in a system comprising a virtualization controller (or some other device positioned in the data path) with a shared cache, and multiple vendor support.

Figure 1:
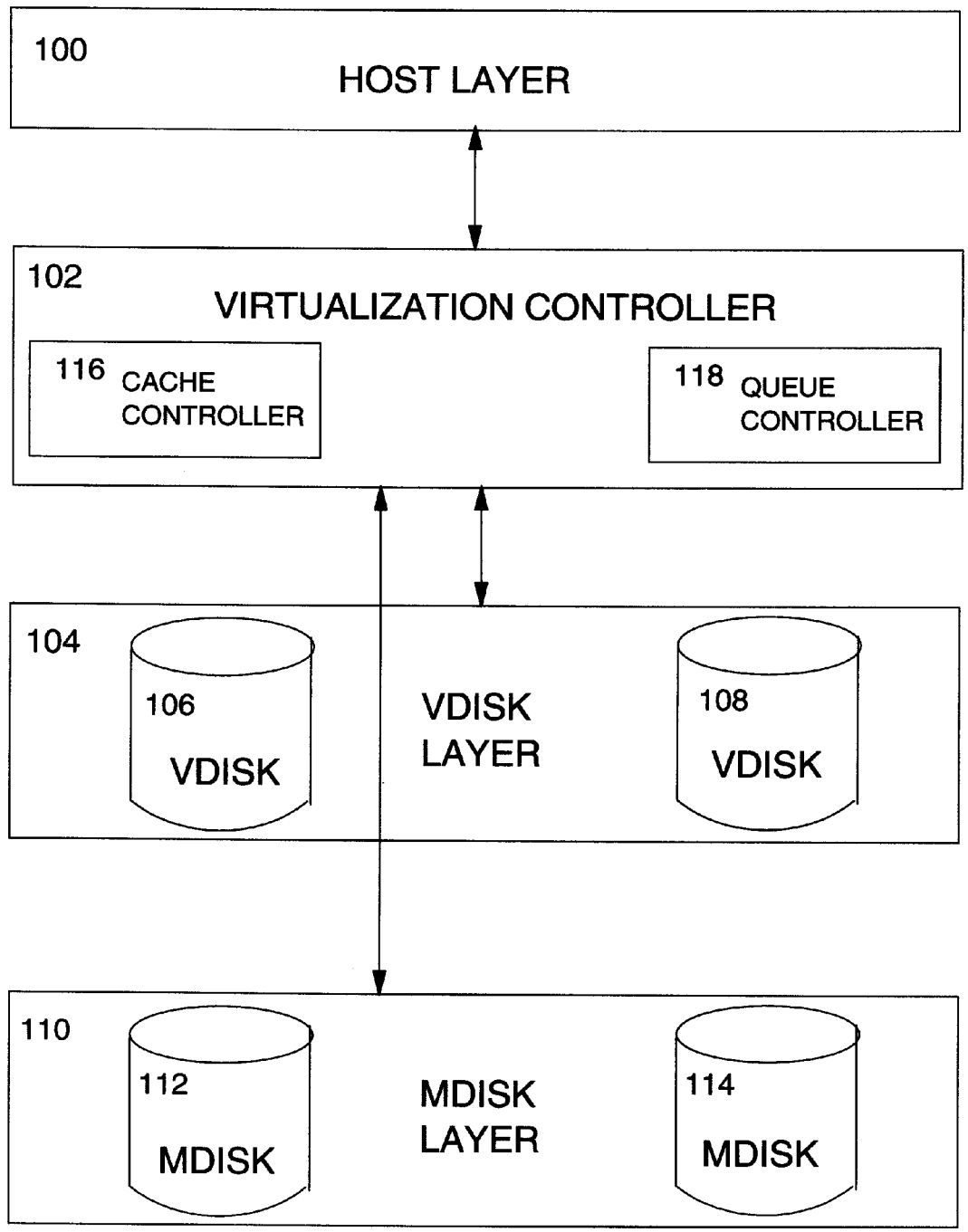
FIG. 1 shows in schematic form in accordance with a preferred embodiment of the present invention.

Turning to FIG. 1, there is shown in a simplified schematic form a virtualized storage system in which the preferred embodiment of the present invention may be implemented.

In FIG. 1, host layer 100 is operable in communication with virtualization controller 102. Virtualization controller 102 is operable in communication with vdisk (virtualized disk) layer 104 and mdisk (managed disk) layer 110. Vdisk layer 104 comprises the virtualized disk mappings vdisk 106 and vdisk 108. Mdisk layer 110 comprises the managed disk mappings mdisk 112 and mdisk 114. It will be clear to one of ordinary skill in the art that there will, in any typical real-world system, be many more of each of the vdisks and mdisks in such a system. Virtualization controller 102 comprises a cache controller 116 and a queue controller 118.

According to a preferred embodiment of the present invention, the virtualization controller is made capable of monitoring all the I/O activity for a given system environment, and then of internally tuning the way it interacts with the storage controllers it is virtualizing. In detail, the data used by such a device could be, for example, the response time for read and write operations, the number of concurrent I/Os for a device, or the like. Such a system can thus be configured to autonomically use this data to tune the caching algorithms and backend queuing algorithms to achieve the optimal performance for the given environment. By taking the data from the devices' own self-tuning algorithms, and storing what specific values they have settled to (to achieve the best performance for the given system) and comparing these to a benchmark known constant (for a completely perfect setup given the virtualizer in question) data can be generated that specifies exactly how well the whole virtualized system is performing against the benchmark, which components are limiting their performance, which components are achieving their performance high water marks, and more importantly what can be done to improve performance down to the detailed level of specific LUNs, controllers or configuration settings.

Figure 2:
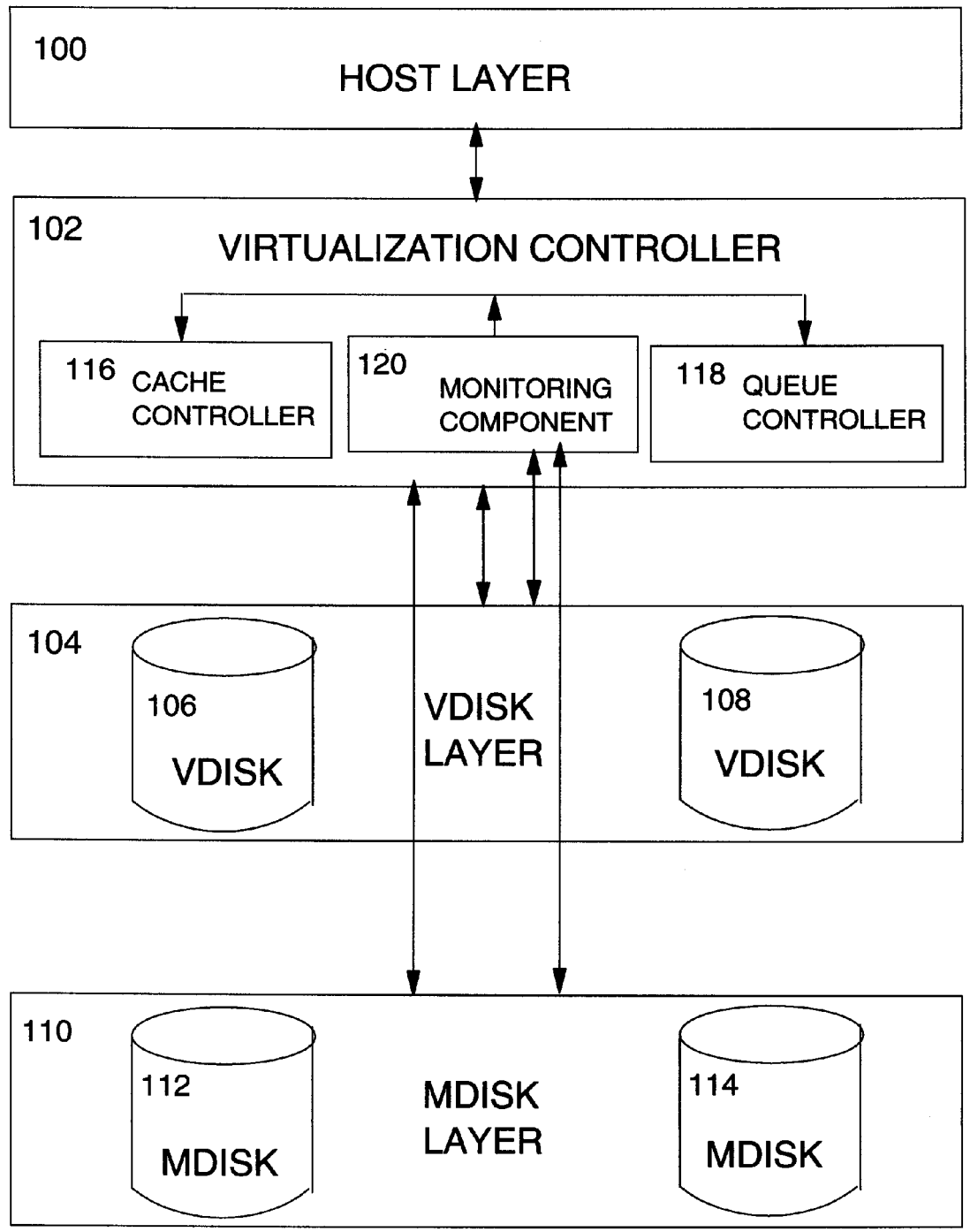
FIG. 2 shows in schematic form an apparatus or arrangement of apparatus in accordance with a preferred embodiment of the present invention.

FIG. 2 illustrates in a simplified schematic form the components of an apparatus or system according the preferred embodiment of the present invention. In addition to the components illustrated in FIG. 1 and described above, there is shown a monitoring component 120 within virtualization controller 102. Monitoring component 120 is operable in communication with vdisk layer 104 and mdisk layer 110 to acquire performance monitoring information relating to vdisks 106, 108 and mdisks 112, 114. Monitoring component 120 is further operable in communication with cache controller 116 and queue controller 118 to provide adjustment values for adjusting the operation of cache controller 116 and queue controller 118, as follows:

1. Cache Characteristics.

Given that the in-band virtualization controller 102 requires a cache to achieve best performance, the cache itself can be tuned on the basis of data about the response times associated with a given virtual disk (vdisk). This data tells the cache how well this vdisk is behaving, and if it is being over- or underloaded. The virtualization controller 102 can then adjust the:

A) cache space allocated to this vdisk; and

B) the rate at which data residing on this vdisk is destaged from the cache. (These values may, in a further refinement, be gathered and stored for each vdisk.)

2. Back End Characteristics.

Given the response time for each managed disk, or "mdisk", (which may be, for example, represented as a logical unit name, or LUN, provided by a controller) the concurrent queue depths can be set. Thus, if a device is responding very quickly, the concurrency can be adjusted upwards, and vice versa. The upward adjustment can be continued until the response time increases beyond a set threshold. Any downward adjustment of concurrency can be continued until the concurrency reaches a value of 1. These actions set the concurrent queue depth for a given mdisk in a given controller. (These numbers may also be stored for each mdisk.)

This allows the virtualization controller 102 to tune the performance characteristics of its interactions with all the devices and controllers within its sphere of virtualization in real time, so that they correspond with the optimum use of the resources in the environment in which it finds itself at any time. The self-tuning can be adjusted while the system is running normally and so can protect the overall system from localised performance issues, if a single disk or controller goes wrong.

In a further refinement, when the performance data has been acquired, a set of benchmark figures—(which might, for example, be associated with a slow disk, an average disk, and a fast disk) may be used to provide further information about the performance and configuration characteristics of the system. The acquisition of data for benchmarking in systems is well-known in the art, and need not be described further here. The numbers recorded in the current system can be compared with the benchmarks. Extracting the details of vdisks shows which vdisks are optimally configured and which are less optimal. The mdisk group information can also be retrieved, for example if one mdisk in that group is failing to perform at the same level as others in the same group, this may point to user configuration issues. If all the mdisks in a controller are performing badly, then this is an indication that the controller cannot handle the workload—actions can be taken in a conventional manner to alleviate this situation.

The preferred embodiment of the present invention in the form of an apparatus or arrangement of apparatus thus advantageously addresses the problem of providing a technical means for controlling performance in storage networks, and more particularly, providing an apparatus for optimising performance in a heterogeneous storage network having a virtualization controller.

Figure 3:
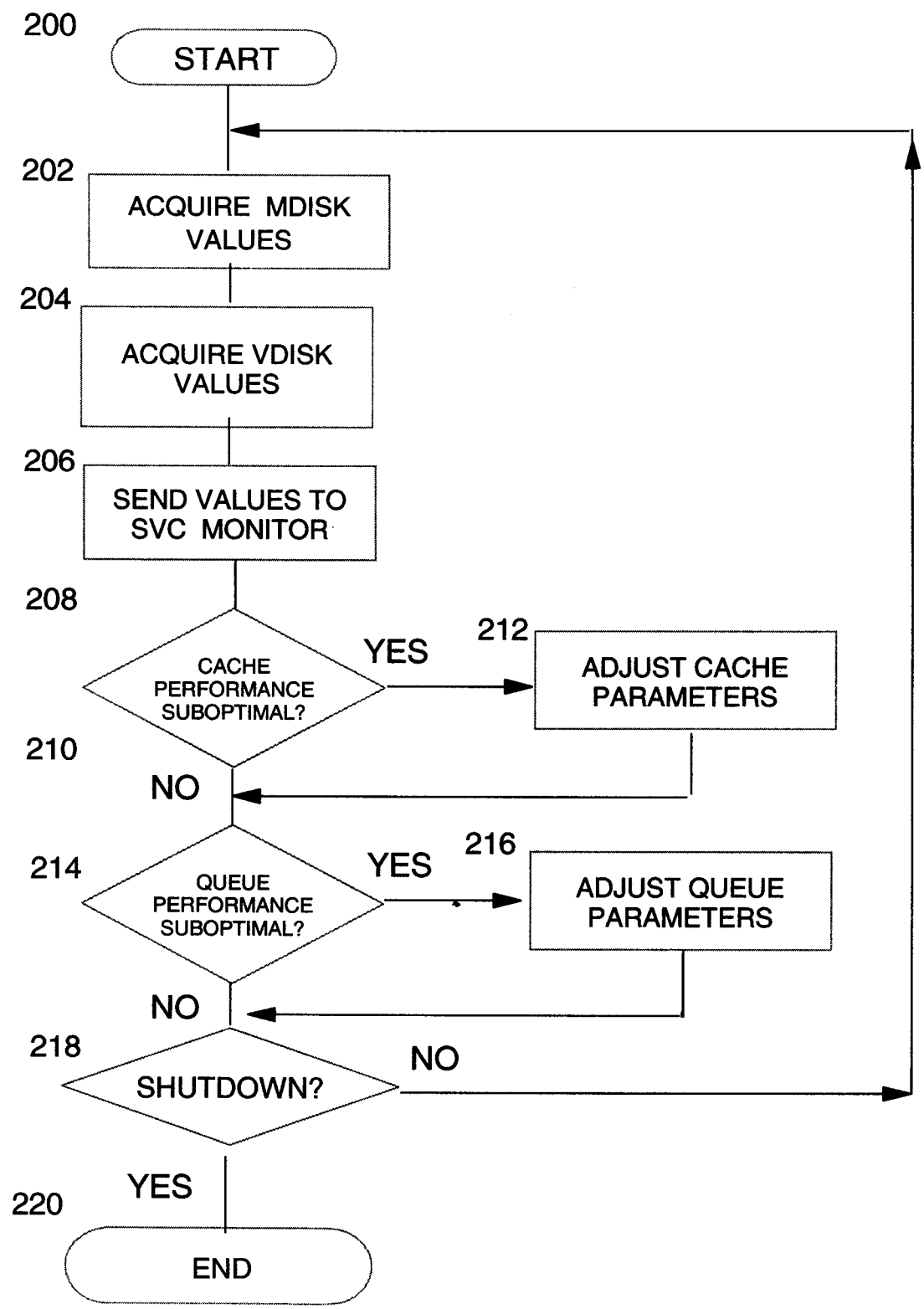
FIG. 3 shows in flowchart form one method or logic arrangement in which a preferred embodiment of the present invention may be implemented.

Turning now to FIG. 3, there are shown in flowchart form the steps of a method or logic arrangement according to a preferred embodiment of the present invention. References to components use the same numbers as were used in FIG. 2, and refer to the same components.

The steps of the method or the sequence of processing of the logic arrangement begin at START step 200. At step 202, the real-time performance values are acquired for the mdisks managed by the virtualization controller 102, and at step 204, the real-time performance values are acquired for the vdisks presented by the virtualization controller 102. At step 206, the values are sent to the SVC monitoring component 120. At test step 208, if cache performance is found to be suboptimal, the cache parameters are adjusted at step 212. If, at test step 214, the queue performance is found to be suboptimal, the queue parameters are adjusted at step 216. The steps are repeated to maintain real-time performance control until the virtualized system is instructed to shut down at step 218, and the sequence completes at END step 220.

The preferred embodiment of the present invention in the form of a method or logic arrangement thus advantageously addresses the problem of providing a technical means for controlling performance in storage networks, and more particularly, of providing a method for optimising performance in a heterogeneous storage network having a virtualization controller.

Thus, preferred embodiments of the present invention are broadly directed to real-time adjustment of the actual data rates the subsystem applies to a particular back end storage device (such as a disk) based on its real-time performance—thus achieving maximum performance from the available system resource at that point in time. This is done without moving any data or changing the configuration of the subsystem. The preferred embodiments of the present invention act upon an existing configuration and internally configure the cache and queue components to optimise the writing of data to match what the device environment can physically cope with at that time.

The utility and advantages of the preferred embodiment of the present invention will be abundantly clear to one of ordinary skill in the art. Among the advantages are:

no performance impact is evident to the user during the tuning process;

no upfront benchmarking is necessary—benchmark data can be derived from the real-time data that has been accumulated using the preferred embodiment of the present invention;

any existing system can be tuned during its operation, in contrast to systems requiring all tuning to be done at the time of vdisk creation;

the system can proactively react to changes in the backend performance characteristics 24×7;

the actual day to day performance can be monitored and reported, thus aiding daily peak management; and general bottlenecks/slowdown problems can be detected very quickly after they occur.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer infrastructure to perform all the steps of the method.

In a further alternative, the preferred embodiment of the present invention may be realized in the form of a data carrier having functional data thereon, the functional data comprising functional computer data structures to, when loaded into a computer system and operated upon thereby, enable the computer system to perform all the steps of the method.

It will be clear to one skilled in the art that many improvements and modifications can be made to the foregoing exemplary embodiment without departing from the scope of the present invention.

The invention claimed is:

1. An apparatus for real-time performance management of a virtualized storage system operable in a network comprising:
an in-band virtualization controller system having at least one processor communicating with a plurality of hosts and a managed physical storage over a network, the managed physical storage comprising a plurality of heterogeneous physical storage devices;
wherein said virtualization controller system lies in a data path between the plurality of hosts and the managed physical storage, said virtualization controller system presenting a virtual storage comprising a plurality of virtual storage devices to said plurality of hosts, said virtualization controller system receiving I/O requests from said plurality of hosts, and responsive to each I/O request, performing a physical translation and redirecting the I/O request accordingly to said managed physical storage;
wherein said virtualization controller system comprises a monitor in communication with the network that acquires performance data from the managed physical storage and the virtual storage, said performance data comprising respective response times for each virtual storage device of said plurality of virtual storage devices; and
wherein said virtualization controller system further comprises a cache controller that adjusts at least one respective cache parameter for each virtual storage device of the virtual storage responsive to the respective response times acquired by the monitor.

2. The apparatus as claimed in claim 1,
wherein said performance data comprises respective performance data corresponding to each physical storage device of the managed physical storage; and
wherein said virtualization controller system further comprises a queue controller that adjusts at least one respective queue parameter for each physical storage device of the managed physical storage responsive to the respective performance data corresponding to the respective physical storage device acquired by the monitor.

3. The apparatus as claimed in claim 2, wherein the monitor, the cache controller, and the queue controller operate periodically during operation of the virtualized storage system.

4. The apparatus as claimed in claim 2,
wherein said performance data comprises respective response time data corresponding to each physical storage device of the managed physical storage, the respective response time data being used by said queue controller to adjust at least one respective queue parameter for each physical storage device of the managed physical storage.

5. The apparatus as claimed in claim 1, wherein the cache controller, responsive to the monitor, adjusts one of:
a cache size parameter for the virtual storage; or
a destage rate parameter for the virtual storage.

6. The apparatus as claimed in claim 1, wherein the monitor further stores and reports a comparison of the performance data from the managed physical storage and the virtual storage with a benchmark of performance data.

7. A method for real-time performance management of a virtualized storage system operable in a network comprising:
acquiring performance data with a monitor in an in-band virtualization controller communicating with a plurality of hosts and a managed physical storage over a network, the managed physical storage comprising a plurality of heterogeneous physical storage devices, said virtualization controller lying in a data path between the plurality of hosts and the managed physical storage, said virtualization controller presenting a virtual storage comprising a plurality of virtual storage devices to said plurality of hosts, said virtualization controller receiving I/O requests from said plurality of hosts, and responsive to each I/O request, performing a physical translation and redirecting the I/O request accordingly to said managed physical storage, said performance data being acquired from the managed physical storage and the virtual storage, said performance data comprising respective virtual storage device performance data for each virtual storage device of said plurality of virtual storage devices and respective physical storage device performance data corresponding to each physical storage device of the managed physical storage;
adjusting, with a cache controller in said virtualization controller, at least one respective cache parameter for each virtual storage device of the virtual storage, responsive to the respective virtual storage device performance data acquired by the monitor; and
adjusting, with a queue controller in said virtualization controller, at least one respective queue parameter for each physical storage device of the managed physical storage, responsive to the respective performance data corresponding to the respective physical storage device acquired by the monitor.

8. The method as claimed in claim 7, wherein the monitor, the cache controller, and the queue controller operate periodically during operation of the virtualized storage system.

9. The method as claimed in claim 7, wherein the cache controller, responsive to the monitor, adjusts one of:
a cache size parameter for the virtual storage; or
a destage rate parameter for the virtual storage.

10. The method as claimed in claim 7,
wherein said performance data comprises respective response time data corresponding to each virtual storage device of the virtual storage, the respective response time data being used by said cache controller to adjust at least one respective cache parameter for each virtual storage device of the virtual storage.

11. The method as claimed in claim 7,
wherein said performance data comprises respective response time data corresponding to each physical storage device of the managed physical storage, the respective response time data being used by said queue controller to adjust at least one respective queue parameter for each physical storage device of the managed physical storage.

12. A computer program product for real-time performance management of a virtualized storage system operable in a network, the computer program product comprising a non-transitory computer useable medium including a computer readable program, wherein the computer readable program when executed on a computer causes the computer to:
acquire performance data with a monitor in an in-band virtualization controller communicating with a plurality of hosts and a managed physical storage over a network, the managed physical storage comprising a plurality of heterogeneous physical storage devices, said virtualization controller lying in a data path between the plurality of hosts and the managed physical storage, said virtualization controller presenting a virtual storage comprising a plurality of virtual storage devices to said plurality of hosts, said virtualization controller receiving I/O requests from said plurality of hosts, and responsive to each I/O request, performing a physical translation and redirecting the I/O request accordingly to said managed physical storage, said performance data being acquired from the managed physical storage and the virtual storage, said performance data comprising respective response times for each virtual storage device of said plurality of virtual storage devices; and
adjust, with a cache controller in said virtualization controller, at least one respective cache parameter for each virtual storage device of the virtual storage, responsive to the respective response times acquired by the monitor.

13. The computer program product as claimed in claim 12,
wherein said performance data comprises respective performance data corresponding to each physical storage device of the managed physical storage; and
wherein the computer readable program when executed on a computer further causes the computer to:
adjust, with a queue controller in said virtualization controller, at least one respective queue parameter for each physical storage device of the managed physical storage responsive to the respective performance data corresponding to the respective physical storage device acquired by the monitor.

14. The computer program product as claimed in claim 13, wherein the computer readable program when executed on a computer further causes the monitor, the cache controller, and the queue controller to operate periodically during operation of the virtualized storage system.

15. The computer program product as claimed in claim 13,
wherein said performance data comprises respective response time data corresponding to each physical storage device of the managed physical storage, the respective response time data being used by said queue controller to adjust at least one respective queue parameter for each physical storage device of the managed physical storage.

16. The computer program product as claimed in claim 12, wherein the computer readable program when executed on a computer causes the cache controller, responsive to the monitor, to adjust one of:
a cache size parameter for the virtual storage; or
a destage rate parameter for the virtual storage.

* * * * *